(12) United States Patent
Sterling et al.

(10) Patent No.: US 10,726,144 B1
(45) Date of Patent: *Jul. 28, 2020

(54) TOKEN-BASED STORAGE SERVICE

(71) Applicant: Amazon Technologies, Inc., Seattle, WA (US)

(72) Inventors: Matthew Ross Sterling, Aliso Viejo, CA (US); Oscar Padilla, Aliso Viejo, CA (US); Thomas James Rader, Long Beach, CA (US); Eric Dominique Gober, Laguna Niguel, CA (US); Scott Eric Geiser, Huntington Beach, CA (US); Dimitar Todorov Zlatkov, Aliso Viejo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,239

(22) Filed: Oct. 6, 2017

Related U.S. Application Data

(63) Continuation of application No. 15/467,913, filed on Mar. 23, 2017, now Pat. No. 9,811,684, which is a continuation of application No. 14/742,450, filed on Jun. 17, 2015, now Pat. No. 9,648,007.

(51) Int. Cl.
*G06F 21/00* (2013.01)
*G06F 21/62* (2013.01)
*G06F 21/31* (2013.01)

(52) U.S. Cl.
CPC ......... *G06F 21/6218* (2013.01); *G06F 21/31* (2013.01)

(58) Field of Classification Search
CPC .................... G06F 21/6218; G06F 21/31
See application file for complete search history.

(56) References Cited

U.S. PATENT DOCUMENTS

| | | | |
|---|---|---|---|
| 8,953,453 B1* | 2/2015 | Xiao | H04L 47/12 370/230 |
| 9,081,978 B1 | 7/2015 | Connolly et al. | |
| 9,300,639 B1* | 3/2016 | Roth | H04L 9/0822 |
| 9,397,835 B1* | 7/2016 | Campagna | H04L 9/32 |
| 9,507,843 B1* | 11/2016 | Madhavarapu | G06F 17/30575 |
| 10,225,795 B2* | 3/2019 | Shaw | H04W 48/20 |
| 2008/0022356 A1* | 1/2008 | Tanaka | H04L 9/0891 726/1 |
| 2012/0259782 A1* | 10/2012 | Hammad | G06Q 20/12 705/44 |
| 2013/0007869 A1* | 1/2013 | Thomas | G06F 21/335 726/9 |
| 2013/0086645 A1* | 4/2013 | Srinivasan | H04L 63/10 726/4 |

(Continued)

*Primary Examiner* — Ali Shayanfar
(74) *Attorney, Agent, or Firm* — BakerHostetler

(57) ABSTRACT

A token-based storage service may comprise a repository of key-value data. In response to a request to store a data item, the storage service may generate a token comprising a namespace and a unique identifier. The token may be used as a key to store and retrieve the data item from the repository. Requests to access the data may be validated based on ownership information stored with the data item and information indicative of the origin of the request for access. In response to a request to store a new version of the data item, a new token may be generated.

20 Claims, 10 Drawing Sheets

(56) References Cited

U.S. PATENT DOCUMENTS

| | | | | |
|---|---|---|---|---|
| 2014/0007208 A1* | 1/2014 | Faludi | G06F 21/00 | 726/7 |
| 2014/0143146 A1* | 5/2014 | Passanha | G06Q 20/40 | 705/44 |
| 2014/0208119 A1* | 7/2014 | Chang | H04L 9/3213 | 713/176 |
| 2014/0241212 A1* | 8/2014 | Janardhanan | H04L 49/55 | 370/255 |
| 2014/0282938 A1* | 9/2014 | Moisa | G06F 21/6218 | 726/6 |
| 2014/0359348 A1* | 12/2014 | Volvovski | G06F 11/1092 | 714/6.22 |
| 2015/0090782 A1* | 4/2015 | Dent | G06Q 20/042 | 235/379 |
| 2015/0277969 A1* | 10/2015 | Strauss | G06F 9/466 | 707/703 |
| 2015/0278243 A1* | 10/2015 | Vincent | G06F 16/182 | 707/634 |
| 2015/0312256 A1* | 10/2015 | Seibert, Jr. | H04L 63/0884 | 726/8 |
| 2016/0034693 A1* | 2/2016 | Takeuchi | G06F 21/604 | 713/189 |
| 2016/0127341 A1* | 5/2016 | Yan | H04L 63/08 | 726/9 |
| 2016/0337369 A1* | 11/2016 | Sanso | H04L 67/1097 | |

* cited by examiner

TOKEN-BASED STORAGE SERVICE

CROSS REFERENCE TO RELATED APPLICATIONS

The present application is a continuation of U.S. patent application Ser. No. 15/467,913, entitled "TOKEN-BASED STORAGE SERVICE", filed Mar. 23, 2017, which is a continuation of U.S. patent application Ser. No. 14/742,450, entitled "TOKEN-BASED STORAGE SERVICE", filed Jun. 17, 2015, the contents of which are hereby incorporated by reference in entirety.

BACKGROUND

The provision of computing services in a multi-tenant environment may involve the storage and retrieval of large quantities of data. A variety of approaches may be employed. Typically, these may involve the use of relational or non-relational database or various ad hoc approaches. Relational databases, such as those that permit the storage and retrieval of data using a structured query language ("SQL") may be suitable in various instances, particularly those where the data is highly structured and where data consistency is of high importance. Non-relational databases, such as those based on key-value storage, may be suitable where scalability is of greater importance than data consistency. However, each of these approaches has various drawbacks that may limit their usefulness in certain scenarios. One such scenario may, in general terms, involve the storage and retrieval of numerous pieces of unstructured data by a variety of applications and application instances, as might be seen in a multi-tenant environment. For example, the storage and retrieval of data related to various performance or usage metrics may not be well-suited for conventional storage approaches using relational or non-relational databases.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
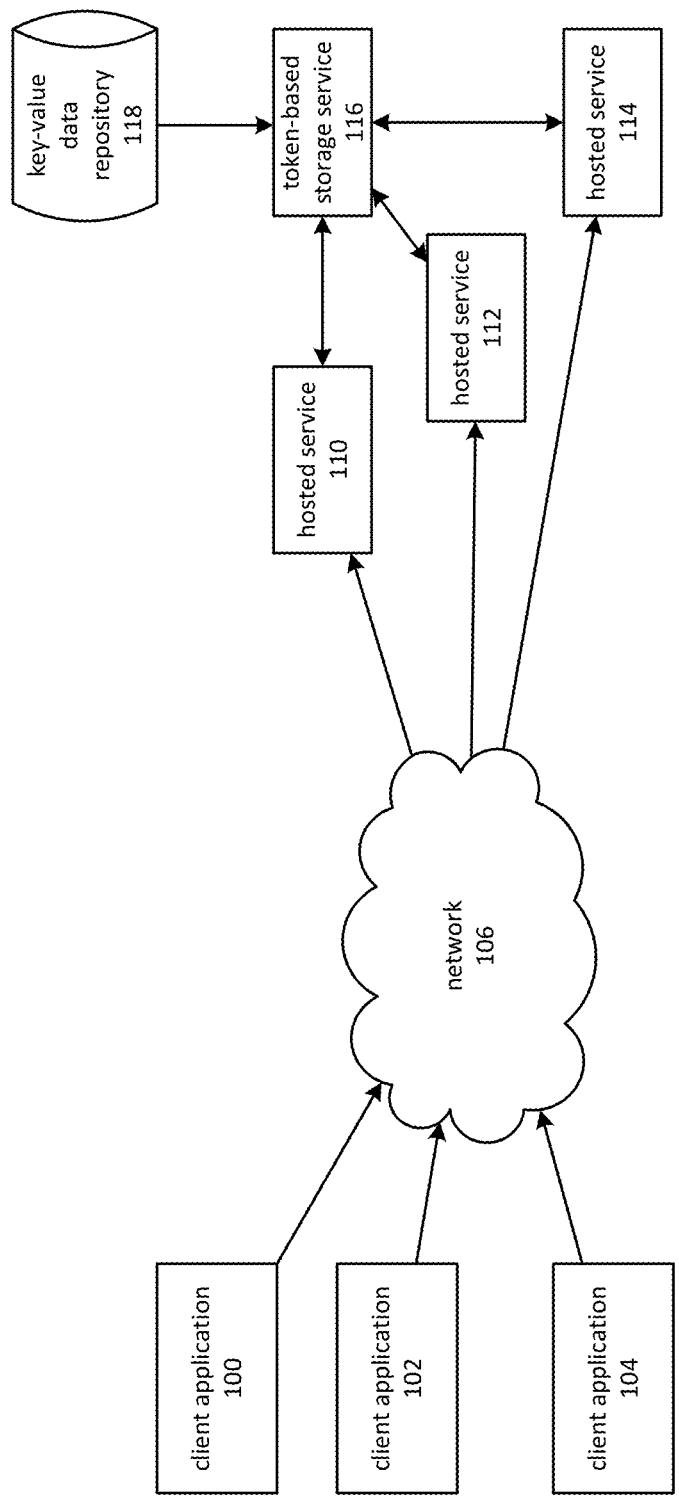
FIG. 1 is a diagram depicting a token-based data storage system.

Disclosed herein are systems and methods for token-based data storage. Token-based storage may provide a lightweight mechanism for storing and retrieving data in a distributed, multi-tenant environment. A token-based storage mechanism may process a request to store data by generating a unique token in response to the request. The token may be returned to the application instance that transmitted the request, and then included in a subsequent request to retrieve the data. The data may be stored within a distributed key-value repository, using the token as the key. Additional aspects of the token-based storage mechanism may secure access to the data through the use of various techniques, which may include token regeneration and validating consistency between the owner of stored data and the originator of a request to access the data.

The disclosed systems and methods may involve multi-tenant computing environments. As used herein, a tenant can refer to an application or application instance hosted on behalf of a customer of a hosted services provider. A multi-tenant computing environment may refer to computational environments that provide services to a plurality of tenants on shared computing resources.

An example system for providing token-based storage may include a distributed key-value repository. A distributed key-value repository may include non-relational database systems implemented on a plurality of computing nodes. The data in the distributed key-value system may be viewed as a collection of key-value pairs. Data may be stored via a "put" operation in which a value and an associated key are provided as parameters to the operation. Data may be retrieved via a "get" operation in which the key is provided as a parameter and the value is returned.

In order to scale to meet the needs of varying (and typically increasing) numbers of clients, the distributed key-value repository may be partitioned so that each computing node in the repository is responsible for storing and retrieving a portion of the data that is maintained by the repository. Various forms of replication and partitioning may be employed to increase the capacity and availability of the system. In some instances, the distributed key-value repository is used by systems in addition to the token-based storage service.

The example embodiment may further comprise one or more computing nodes on which various modules related to the token-based storage services may operate. These modules may include a storage module for processing requests to store data in the distributed key-value repository, a token generator module to generate tokens, and a retrieval module to retrieve data from the distributed key-value repository. These and other aspects of the token-based storage service may operate as "micro-services," in that they are relatively lightweight services that may be scaled independently.

A request to store a data item may be received from an instance of a client application and processed by a storage module. In response to receiving the request, the storage module may obtain from a token generator module a token that comprises a namespace and a randomly generated unique identifier. The namespace portion of the token may identify an owner of the data item that is to be stored, for example by including in the namespace information that identifies a tenant or an application that owns the data item. The namespace portion may also, in some instances, include information that identifies the data item, such as information related to the data's type or semantic meaning. The unique identifier portion of the token may be a randomly generated sequence of alphanumeric characters or binary data whose length is sufficient to ensure that the token is unique across all other token instances. The unique identifier portion of the token may be generated upon each request to store a data item.

Requests to retrieve the data item may be processed by examining a copy of the token included in the request. The namespace information may contain, or can be used to obtain, information that is indicative of the owner of the data item. This information may, for example, identify a tenant, application, application instance, or user associated with the original request to store the data item. This information may be compared to similar information related to the request to retrieve the data item. If there is commonality between them, the request to retrieve the data item may be treated as valid.

The token-based storage service may process additional requests to store new versions of the same data item. For example, upon receiving a request to store a data item, the token-based storage service may determine that the request corresponds to a previous version of an existing data item. In response to the determination, the token-based storage service may generate a new token, store the new version of the data item using the new token, and cause the previous token to be invalidated. The previous version of the data item may, in some cases, be marked as deleted and subsequently deleted from the distributed key-value repository.

FIG. 1 is a diagram depicting a token-based data storage system. A provider of computing capacity may operate various hosted services 110, 112, and 114 on behalf of its customers. A customer of the provider may sometimes be referred to as a tenant. Computing systems and services that operate on behalf of multiple customers may sometimes be referred to as multi-tenant. The term multi-tenant may also refer to computing systems and services that operate on behalf of multiple instances of other entities, such as various applications or application instances. In FIG. 1, a token-based storage service 116 may be described as being multi-tenant because it operates in support of multiple hosted services 110, 112, and 114. These hosted services 110, 112, and 114 may be owned by various customers of the provider, but executing on computing nodes maintained and operated by the provider. Various client applications 100, 102, and 104 may access the hosted services 110, 112, and 114 via a network 106, such as the Internet. The client applications 100, 102, and 104 may typically be operated by a user associated with a customer of the provider. A client application 100 may request that a hosted service 110 perform various operations on its behalf.

The hosted service 110 may need to store and retrieve various data items while performing an operation on behalf of client application 100. The hosted service 110 may transmit a request to store a data item to a token-based storage service 116. In response, the hosted service 110 may receive a token usable to subsequently retrieve the data item. The token may be maintained by hosted service 110 or, in some cases, by client application 100.

The data item may be stored in a key-value data repository 118. This may include various systems for storing and retrieving data based on a key-value. In an embodiment, the key-value data repository 118 includes a distributed, non-relational database system. Examples of a distributed, non-relational database system include, but are not limited to, "NoSQL" database systems.

The token-based storage service 116 may operate as a multi-tenant service, for example by serving each of the hosted services 110, 112, and 114 that FIG. 1 depicts. The token-based storage service 116 may be configured, as described herein, with various features providing for scalability and security in a multi-tenant environment.

Figure 2:
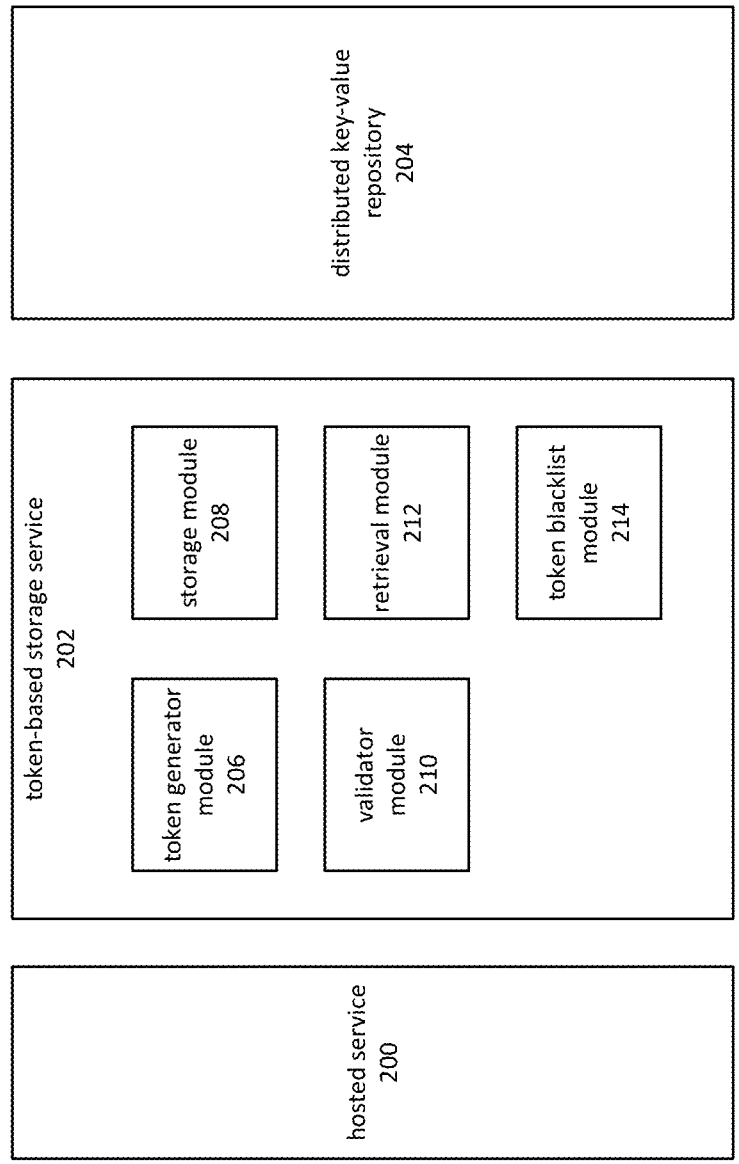
FIG. 2 is a diagram depicting components of a token-based storage service.

FIG. 2 is a diagram depicting components of a token-based storage service 202. The token-based storage service 202 may receive a request from a hosted service 200 to store and retrieve a data item. The token-based storage service 202 may also receive requests from other sources, in addition to a hosted service 200. For example, the token-based storage service 202 might receive requests transmitted from one of the client applications 100, 102, and 104 depicted in FIG. 1 directly to the token-based stored service 202.

The token-based storage service 202 may store the data item in a distributed key-value repository 204. The distributed key-value repository 204 may consist of a number of computing nodes, typically operating on lower-cost computing devices. Additional nodes may be added to or removed from the distributed key-value repository 204 in order to adjust to the computational demands of storing and retrieving data on behalf of the token-based storage service 202. Other services may also utilize the distributed key-value repository 204—its use need not be exclusive to the token-based storage service 202.

The token-based storage service 202 may also be distributed among a plurality of computing devices in order to provide scalability. Accordingly, the various modules 202-214 that are depicted as components of the token-based storage service 202 may be distributed and, in some cases, duplicated across a number of computing nodes.

The token-based storage service 202 may comprise a token generator module 206 for creating tokens for use in storing data within the distributed key-value repository 204 and to return to hosted service 200 as an identifier of the stored data. The token generator module 206 may form tokens so that the tokens comprise information indicative of a namespace and a unique identifier.

The namespace information may include a string of alphanumeric characters, a binary sequence, or other data, and may correspond to a logical categorization of the data to be stored. Examples of a logical categorization include information corresponding to a hierarchy involving a tenant, an application, and the semantic meaning of the data item that is to be stored in association with the generated token. In some cases, the namespace information may be directly incorporated into the generated token. In other cases, a reference to the namespace information can be inserted into the token and the namespace information itself may be stored elsewhere, such as in the distributed key-value repository 204.

The unique identifier may be a randomly generated string of alphanumeric or binary data. Typically, pseudo-random algorithms would be used to generate the unique identifier, so the use of the term "random" should not be construed as limited to algorithms with a very high degree of randomness. However, embodiments may utilize random or pseudo-random identifier generation algorithms that do not rely on hardware characteristics or other information that might increase a probability of collisions between tokens.

A storage module 208 may utilize the generated token to store the data item in the distributed key-value repository 204. The distributed key-value repository may, for example, process a "put" command that accepts a key and a value. The storage module 208 may supply the token as a key and the data item as the value. The distributed key-value repository 204, which may typically comprise a number of computing nodes, may identify which computing node on which to store the data item using a hash function or other partitioning mechanism. The selected computing node may sometimes be referred to as a partition. The use of multiple computing nodes, or partitions, permits the token-based storage service 202 to be scalable.

A validator module 210 may determine whether a request to retrieve the data item is valid. In various instances, validating the request to retrieve the data item can include using the token to retrieve, from the distributed key-value repository 204, information that is indicative of the owner of the data item. In other instances, the information indicative of the owner may be embedded within the token. In such cases, the validator module 210 may extract the information from the token. Regardless of how the information is obtained, it may be compared to information about the origin of the request to access the data item that may have been included in the request to access the data item.

The validator module 210 may determine that the request to retrieve the data item is valid by identifying commonality between the ownership information and the information indicative of the origin of the request to retrieve the data item. For example, the validator module 210 might determine that the request is valid if a given tenant is an owner of the data item and is also associated with the origin of the request. This might be the case even if, for example, an application that stored the data is not associated with the request to retrieve the data item. In other cases, both the tenant and application might be required to correspond.

A retrieval module 212 may use the token to retrieve the data item from the distributed key-value repository 204. For example, the distributed key-value repository 204 may support a "get" method that accepts a key as a parameter, and returns a value associated with the key. The retrieval module 212 may supply the token as a parameter to the "get" function and receive, in return, the data item that had been previously stored by the storage module 208.

A token blacklist module 214 may, in response to various events or conditions, cause a token to be treated as invalid for subsequent requests to retrieve the data item with which it was originally associated. One such event may, in some embodiments, occur when a new version of a data item is stored in the system. For example, a client process, such as the hosted service 200, might request that a data item corresponding to a particular value be added to the distributed key-value repository 204 via the token-based storage service 202. The token-based storage service 202 might then return a first token to the hosted service 200. Subsequently, the hosted service might request that a modified version of the particular value be stored in the distributed key-value repository 204. The token-based storage service 202, upon receiving this request, might then determine that the value being stored corresponds to a new version of a previously stored value, or is equivalent to the previously stored value, and invalidate the first token. The token-based storage service 202 might then store the version of the particular value in the distributed key-value repository 204 using a newly generated token, and return the newly generated token to the hosted service 200.

Note that in some cases, the functionality associated with the token blacklist module 214 may be achieved by removing a key-value pair corresponding to the token from the distributed key-value repository 204. In such cases, a token may be considered invalid if its corresponding key-value pair is no longer stored in the distributed key-value repository 204.

Figure 3:
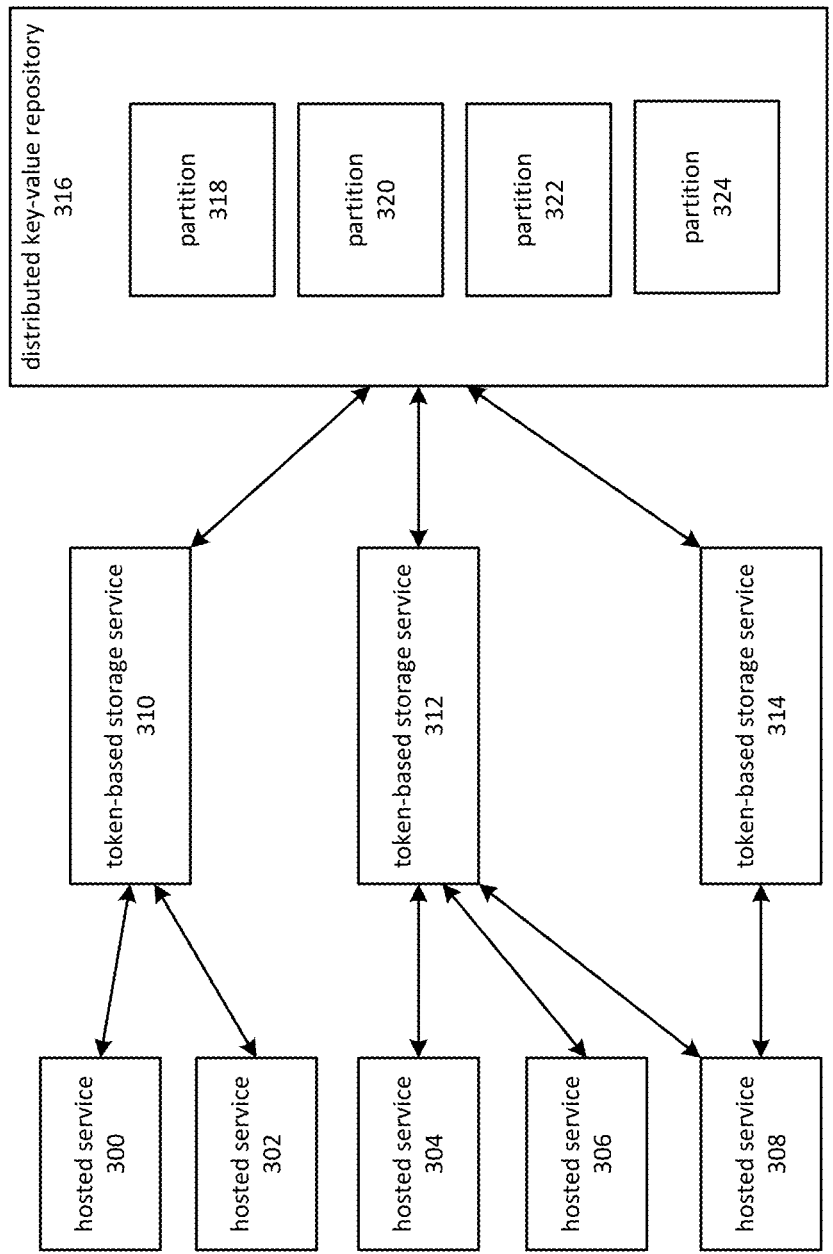
FIG. 3 is a diagram depicting scaling of token-based storage services.

FIG. 3 is a diagram depicting scaling of token-based storage services. The provision of token-based storage may be adapted to various levels of computational demands by independent scaling of its various components. For example, FIG. 3 depicts independent scaling of hosted services 300-308, token-based storage services 310-314, and partitions 318-324 of the distributed key-value repository 316.

As depicted by FIG. 3, computational demands associated with the provision of token-based storage may be affected by the addition or subtraction of various hosted services 300-308. The hosted services 300-308 may be hosted on a plurality of computing nodes, the number of which may be adjusted as services are added or subtracted, or as the use of those services rises or falls. Based on the activity levels of the various services, and potentially other factors, the demand for token-based storage may also rise and fall.

To adjust to the demand for token-based storage services, instances of token-based storage services 310-314 may be added or subtracted. Embodiments of the token-based storage services 310-314 may be stateless and moreover may require little or no communication between other instances of a token-based storage service. For example, a first instance of a token-based storage service 310 may generate tokens and store data in the distributed key-value repository 316 independently of the other token-based storage services 312 and 314.

In some cases, components of the token-based storage services 310-314 may be scaled independently of each other. For example, referring back to FIG. 2, the token generator module 206 might be deployed and scaled independently of the storage module 208 and the retrieval module 212. If the computational demands of the storage module 208 are greater, for example, than that of the token generator module 206, the storage module 208 might be deployed to a greater number of computing nodes than the token generator module 206.

Figure 4:
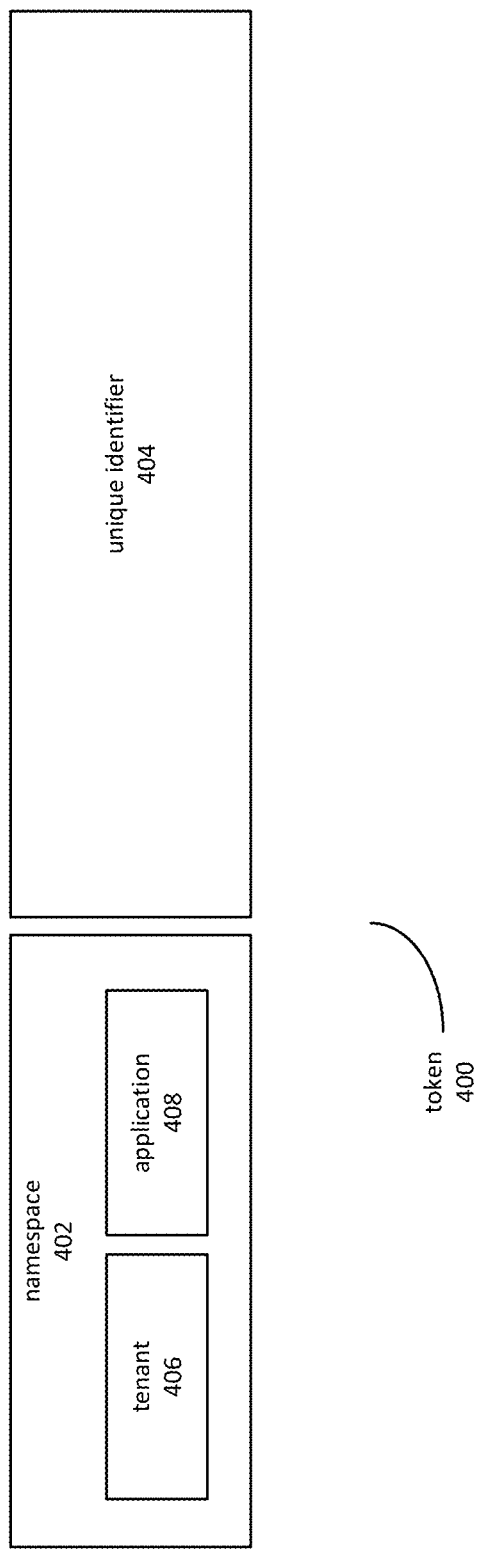
FIG. 4 is a diagram depicting an example of a token.

The composition of the token generated by the token generator module 206 is an enabling factor in the scalability of token-based storage. FIG. 4 is a diagram depicting an example of a token 400. The token 400 may comprise at least two components, including a namespace 402 and a unique identifier 404. In some instances, additional data might be included to identify the type of data, its semantic meaning, and so on.

The unique identifier 404 may comprise a sequence of alphanumeric characters or a sequence of binary data. Various generation techniques may be employed to form the unique identifier 404. However, in order to preserve the various scalability characteristics described herein, embodiments may prefer mechanisms that avoid interdependence between instances of a token generator module, such as the token generator module 206 depicted by FIG. 2. This may be achieved by generating a random sequence of alphanumeric characters or binary data of sufficient length, so that the possibility of collisions is reduced to an acceptable level.

The namespace 402 may include information that identifies metadata associated with the data, such as a tenant 406 and application 408 with which the data is associated. The information may, in some cases, be supplied by a process, such as the hosted service 200 depicted in FIG. 2, when it requests that a data item be stored on its behalf. In some embodiments, the information may be obtained from the context of the request, rather than being explicitly supplied by the process. This approach may allow for greater reliability when authenticating requests, since it may be more difficult to spoof information that is not supplied explicitly.

Figure 5:
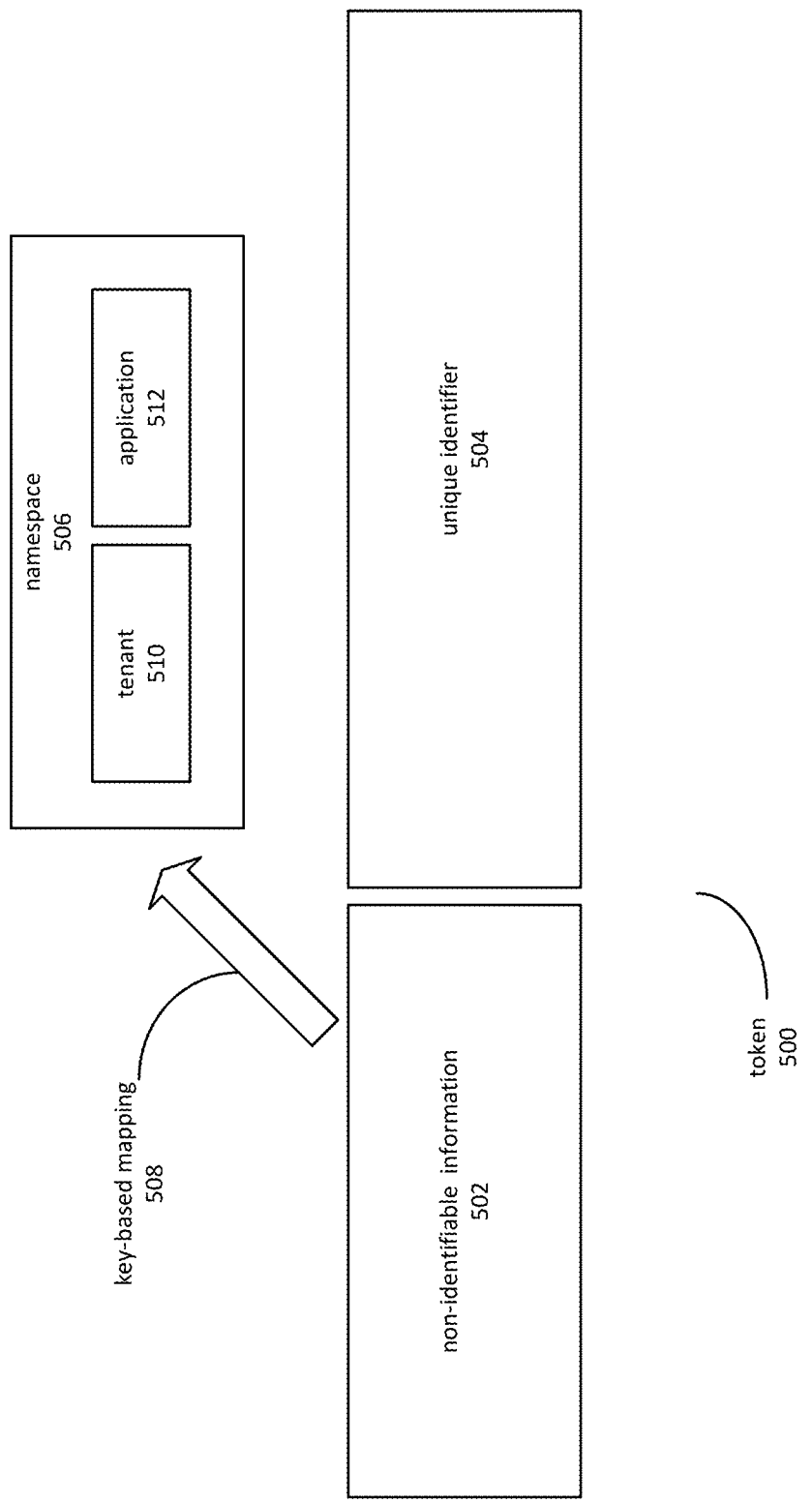
FIG. 5 is a diagram depicting an example of a token with encoded namespace information.

FIG. 5 is a diagram depicting an example of a token with encoded namespace information. The token 500 may, similar to the token 400 depicted in FIG. 4, include a unique identifier portion 504. The token 500 may also contain a portion that is indicative of a namespace for the data item to be associated with the token. However, rather than directly embedding the namespace information token, indirection may be used. Some form of non-identifiable information 502, such as a randomly generated sequence of alphanumeric characters or data, may be stored within the token. The information describing the namespace 506, which can include tenant information 510 and application information 512, may be stored elsewhere and accessed via a key-based mapping 508, where the key may be the non-identifiable information 502 or the token 500, including the non-identifiable information 502. In various embodiments, the key-based mapping 508 may be based on storing the namespace information 506 in a key-value repository using the non-identifiable information 502 or the token 500 as a key.

Figure 6:
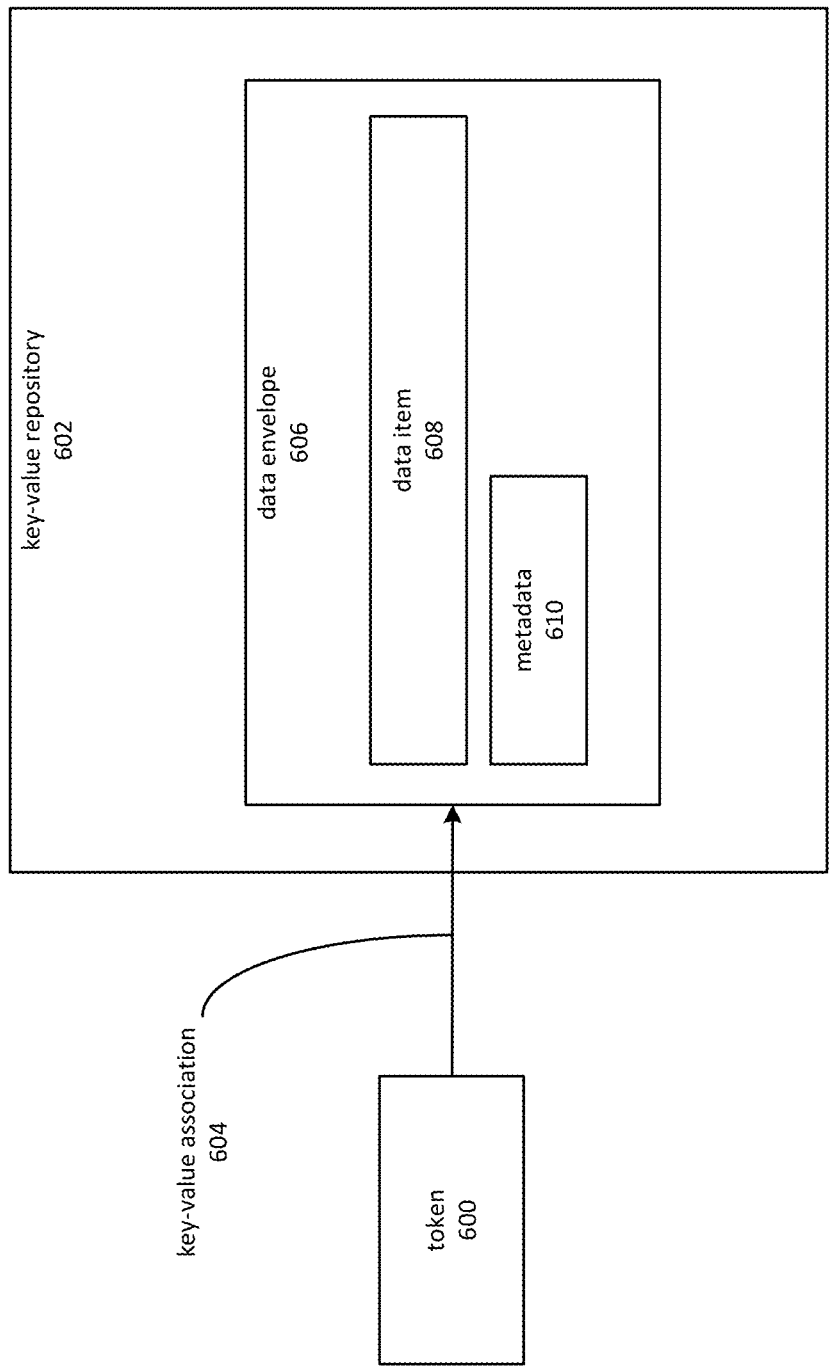
FIG. 6 is a diagram depicting associations between a token, a data item, and metadata for the data item stored in a key-value repository.

A data item may be stored in a key-value repository with associated metadata. FIG. 6 is a diagram depicting associations between a token, a data item, and metadata for the data item stored in a key-value repository. A token 600 may be stored within a key-value repository 602 based on a key-value association 604. Typically, the key-value association 604 is maintained by the key-value repository using indices and other structures to allow for storage and retrieval of values based on keys. The token 600 may be a key for storing and retrieving a data envelope 606, which can contain the data item 608 and metadata 610. The use of a data envelope 606 may allow for the token 600 to be used to access both the data item 608 and the associated metadata 610. However, in some cases, other approaches may be used, such as storing the metadata 610 in a collection that is separate from that of the data item 608.

The metadata 610 can include information that is indicative of the ownership of the data item. This may include information describing a tenant, application, application instance, user, device, and so on. The information may relate to the request associated with storing the data item.

In some embodiments, portions of the metadata 610 may be indexed by the key-value repository and made searchable. For example, the metadata 610 may contain information indicating the semantic meaning of the data item 608. By searching an index of this data, an application can access data stored by a number of applications. This might be done, for example, in order to calculate an average or total value for some metric stored by a number of tenants or services.

Figure 7:
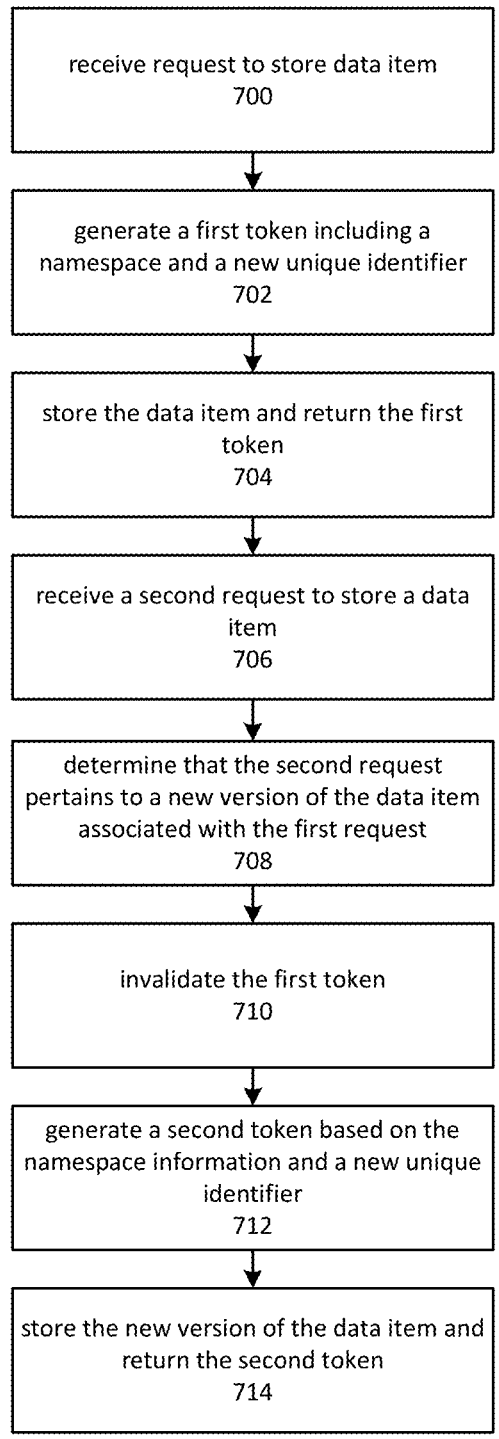
FIG. 7 is a flow diagram depicting storage of a data item by a token-based storage service.

FIG. 7 is a flow diagram depicting storage of a data item by a token-based storage service. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

As depicted by block 700, a token-based storage service may receive a request to store a data item. For example, with reference to FIG. 2, the request may be transmitted by the hosted service 200 and received by the storage module 208. The request may comprise a data item, or a reference to the data item. The request may further contain information that may be used to form a namespace for inclusion in a token. The namespace information may be explicitly supplied—for example, as a parameter to the request—or it might be inferred from other information included in the request. The information contained in the request may pertain to the owner of the data item. The information might, for example, be indicative of a tenant, application, application instance, or user.

As depicted by block 702, embodiments may generate a first token that includes a namespace and a new unique identifier. The information for the namespace may be obtained from the request received at block 700. For example, the storage module 208 might invoke the token generator module 206 and provide it with a namespace parameter included in the request. The storage module 208 might also provide the token generator module 206 with additional information, such as information indicative of the owner of the request.

The storage module 208 may then, as depicted by block 704, cause the data item to be stored in the distributed key-value repository 204 depicted in FIG. 2. The storage module 208 may supply the newly generated token as the key for the storage operation. The token may then be returned to the caller.

As depicted by block 706, the embodiment of the token-based storage service may receive a second request to store a data item. Block 708 shows that the embodiment may determine that the second request to store a data item pertains to a new version of the same data item. For example, the storage module 208 might receive the second request and examine its contents to determine that the namespace corresponds to one already used to store a data item. In response to this determination, the storage module 208 might invalidate the first token, as depicted by block 710. This may be done, in some cases, in coordination with the token blacklist module 214 that FIG. 2 depicts. In some instances, the first version of the data item may be deleted or marked for subsequent deletion. An effect of this approach is that it increases security of the data. If an unauthorized party were to gain access to a token and bypass any other security measures in place, it would only be able to access one version of the data, and only while the token remained valid. A token may be invalidated using a number of techniques. In general, these techniques involve storing information that is indicative of the token being invalid and which would cause subsequent attempts to retrieve the data item using the first token to be ineffective. This can involve techniques such as modifying the key-value database to remove a previous association between the first token and the data item, reassociating the first token with information other than the data item, or using the token blacklist module 214. It will be appreciated that the term storing, as used in association with invalidating a token, can include modifications to data structures, the addition of data, or other such operations.

Block 712 depicts the generation of a second token based on the namespace information and a newly generated unique identifier. In some instances, the namespace information may be identical to the namespace information included in the first token. In other instances, it may also vary. The unique identifier may be regenerated for each new token, so that the new token does not match any previous token.

Once the second token has been generated, the new version of the data item may be stored in the distributed key-value data store using the second token as a key. This operation is depicted by block 714. The second token may be returned to the client that invoked the second request. For example, the hosted service 200 depicted in FIG. 2 may receive the second token in response to issuing the request. The hosted service 200 may then store the token in a subsequent request to retrieve the data item.

Figure 8:
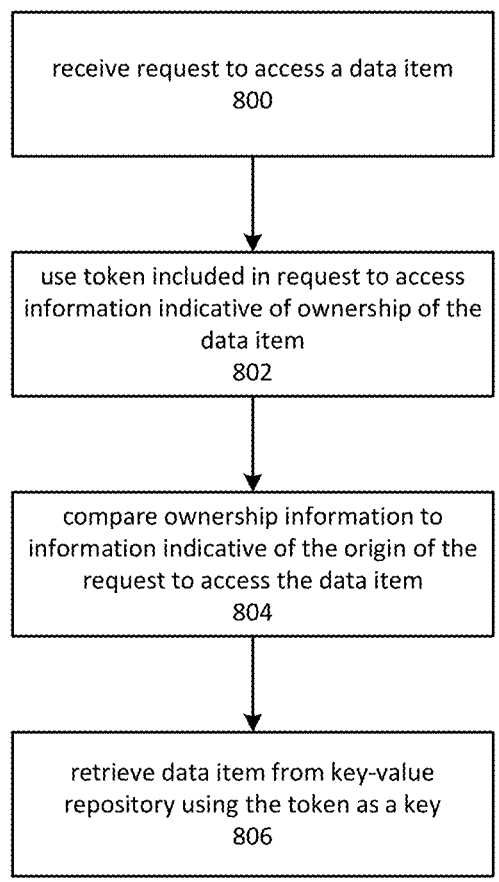
FIG. 8 is a flow diagram depicting retrieval of a data item stored using a token-based storage service.

FIG. 8 is a flow diagram depicting retrieval of a data item stored using a token-based storage service. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 800 depicts an embodiment of a token-based storage service receiving a request to access a data item. The request may be transmitted, for example, by the hosted service 200 that is depicted by FIG. 2. After being received by the token-based storage service, the request may be processed by a module of the token-based storage service such as the retrieval module 212 depicted in FIG. 2. The request may include a token previously supplied to the client process. For example, the hosted service 200 depicted in FIG. 2 may have previously transmitted a request to store a data item to the token-based storage service and received a token in response. The hosted service may then include the token as a parameter in a subsequent request to retrieve the data item.

At block 802, the retrieval module 212 may convey information about the request to the validator module 210. The information may include the token, which may be used in whole or in part to obtain information indicative of the ownership of the data item that is to be retrieved. For example, with reference to FIG. 6, information indicative of the ownership of the data item may be obtained by utilizing a key-value association 604 to access metadata 610.

As depicted by block 804, the validator module 210 may compare the information indicative of the ownership of the data item to information obtained from the request that is indicative of the origin of the request to access the data item. The comparison may be a basis for validating the request to access the data item. For example, the validator module 210 may obtain context information from the request—such as information describing the tenant, application, application instance, or user—and compare the context information to corresponding information in the metadata 610. The validator module 210 may also, for example, determine that the token is no longer valid by utilizing token blacklist module 214.

In some instances, it may be determined that the request to access the data item is authorized based at least in part on the data item itself. The validator module 210 might, for example, compare a portion of the data item to a value of a parameter included in the request to access the data item. This may provide an additional element of security by preventing access to the data item unless the requestor knows at least something about the data item and supplies it as a parameter to the request for access.

If the validator module 210 determines that the request originated from a source that is associated with or is otherwise authorized to access the data item, and has not been invalidated, it may, as depicted by block 806, retrieve the data item from the distributed key-value repository using the token as a key. The data item may then be returned to the hosted service 200.

Figure 9:
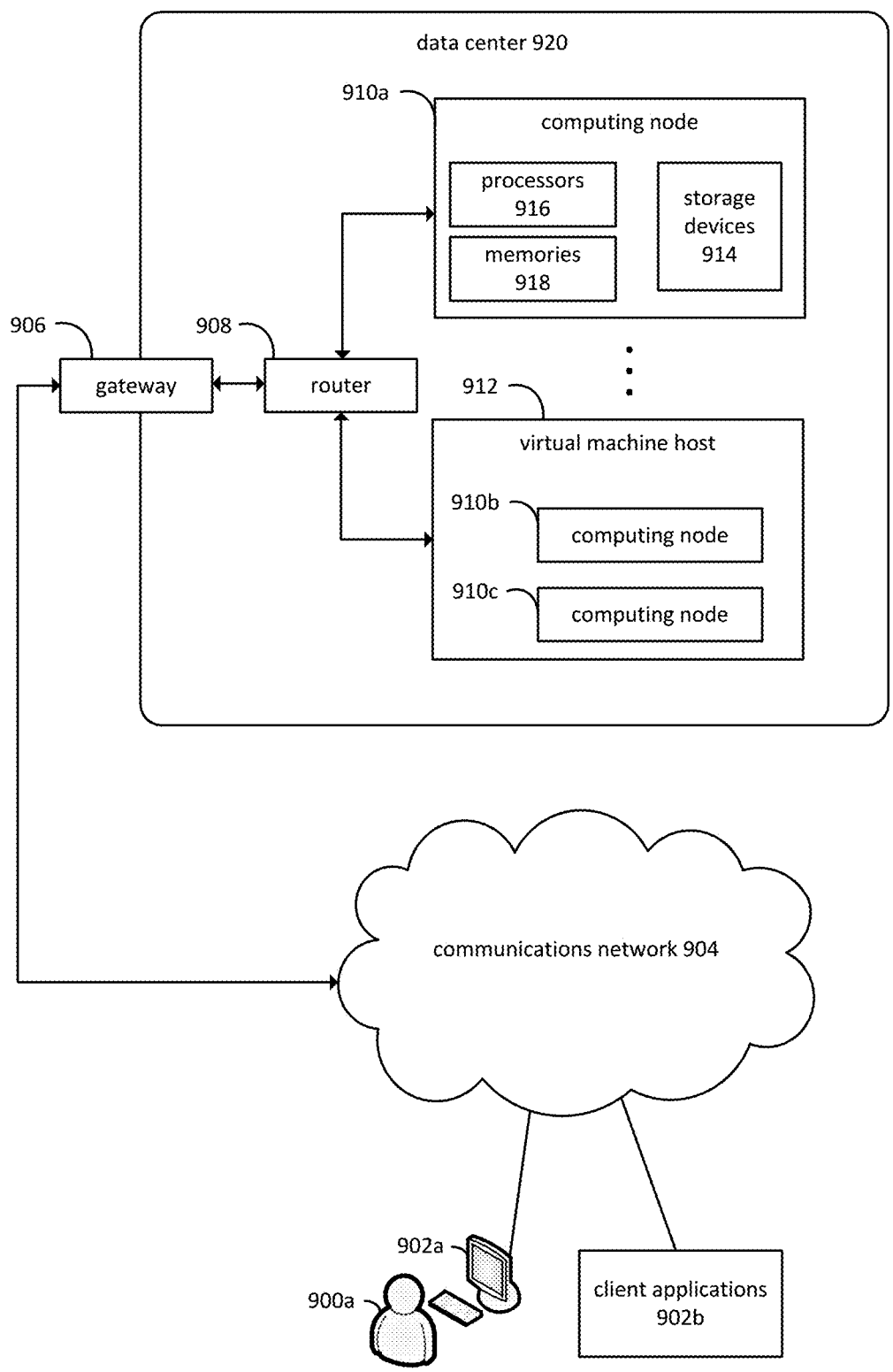
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b, and 910c within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a, 910b, and 910c, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a, 910b, and 910c. Some of these intermediate layers may themselves comprise processes executing on one or more of the computing nodes. Computing nodes 910a, 910b, and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918, and one or more storage devices 914. Processes on computing node 910a may execute in conjunction with an operating system or alternatively may execute as a bare-metal process that directly interacts with physical resources, such as processors 916, memories 918, or storage devices 914.

Computing nodes 910b and 910c are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 10:
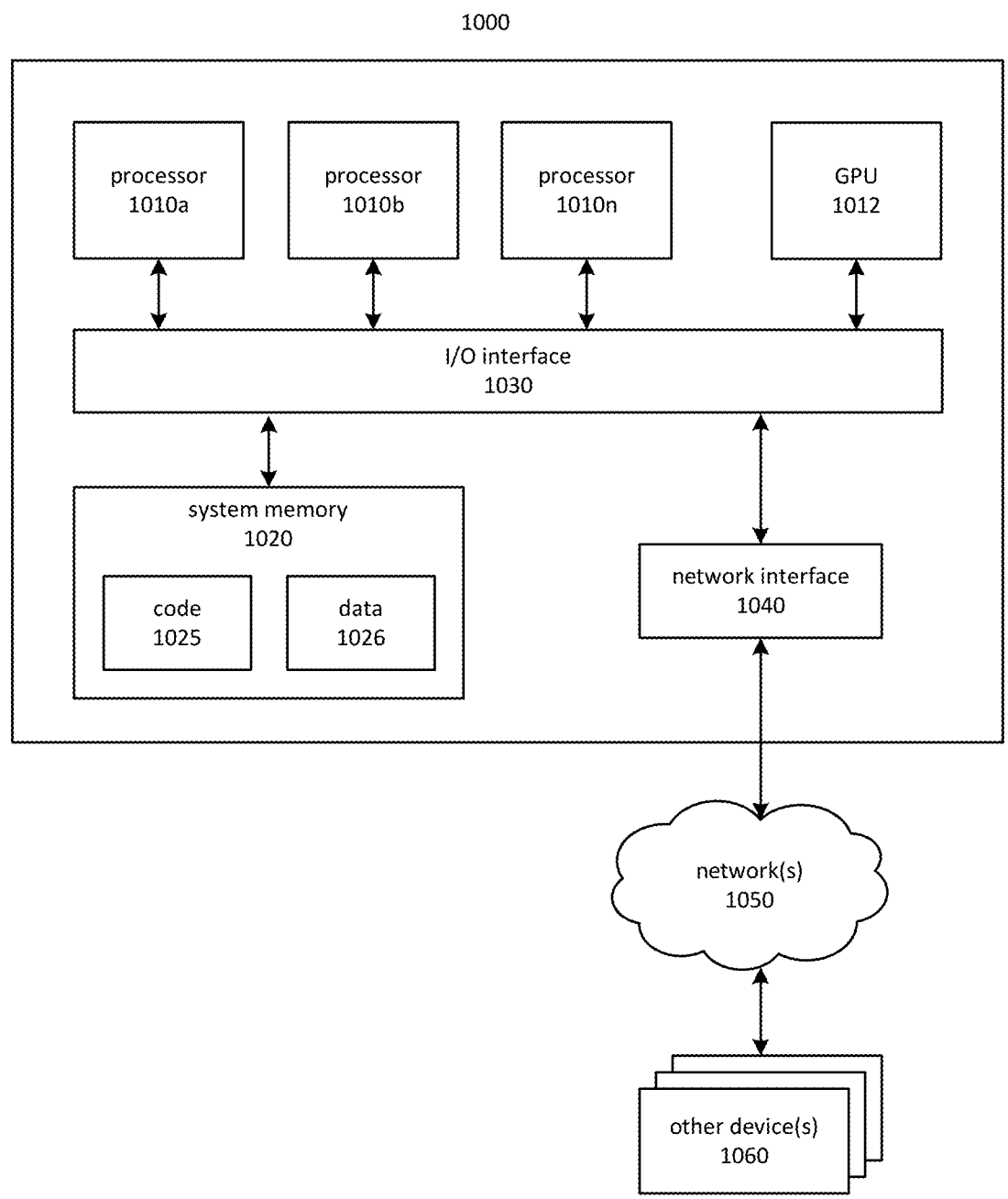
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
a memory to store machine-readable instructions, which as a result of being performed by at least one processor, cause the system at least to:
in response to a first request to store a data item in a database, providing a first token generated to uniquely identify the data item;
store information associating the data item with the first token for accessing the data item;
in response to a second request to modify the data item, store information associating the modified data item with a second token generated to uniquely identify the modified data item; and
provide access to the modified data item based on the second token.

2. The system of claim 1, wherein the database is a distributed database comprising a first plurality of computing nodes.

3. The system of claim 2, wherein the first token and second token are generated by a service comprising a second plurality of computing nodes, the second plurality of computing nodes independent of the first plurality of computing nodes.

4. The system of claim 3, wherein at least one of the second plurality of computing nodes stores the information associating the first token with the data item.

5. The system of claim 1, the memory to store machine-readable instructions, which as a result of being performed by a processor, cause the system at least to:
generate the first token to comprise information indicative of an owner of the data item and information indicative of an application associated with the data item.

6. The system of claim 1, the memory to store machine-readable instructions, which as a result of being performed by a processor, cause the system at least to:
select a computing node to store the data item; and
generating the first token to comprise information indicative of the selected computing node.

7. A method comprising:
providing, in response to a first request to store a data item, a first token generated to uniquely identify the data item;
storing information associating the first token with the data item for accessing the data item;
providing, in response to a second request to store a modified version of the data item, a second token generated to uniquely identify the modified version of the data item; and
providing access to the modified version of the data item based at least in part on the second token.

8. The method of claim 7, further comprising:
storing information associating the second token with the modified version of the data item.

9. The method of claim 7, further comprising:
storing, in response to the second request, information indicative of the first token being invalid.

10. The method of claim 7, wherein the data item is stored in a database as a key-value pair.

11. The method of claim 7, further comprising:
generating the first token by a first at least one computing node separate from a second at least one computing node that maintains a database comprising the data item.

12. The method of claim 11, wherein the first at least one computing node is scaled independently of the second at least one computing node.

13. The method of claim 7, further comprising:
storing metadata associated with the first token, the metadata comprising at least one of information indicative of an owner of the data item, information indicative of a user of the data item, information indicative of an application associated with the data item, or information indicative of a semantic meaning of the data item.

14. The method of claim 13, further comprising:
providing access to the metadata based at least in part on the first token.

15. A method, comprising:
storing a data item in a database, the data item indexed in the database by a first token;
validating, based at least in part on the first token, a request to modify the data item;
storing, based on validating the request to modify the data item, the modified data item in the database, the modified data item indexed by a second token different than the first token; and
storing information indicating that the first token is invalid for accessing the data item.

16. The method of claim 15, further comprising:
receiving a request to store the data item in the database, the request comprising the data item; and
returning the first token in response to the request.

17. The method of claim 15, further comprising:
providing access to the data item based at least in part on the first token; and
providing access to the modified data item based at least in part on the second token.

18. The method of claim 15, further comprising:
storing metadata associated with the first token, the metadata comprising at least one of information indicative of an owner of the data item, information indicative of a user of the data item, information indicative of an application associated with the data item, or information indicative of a semantic meaning of the data item.

19. The method of claim 18, further comprising:
forming an index based on the stored metadata.

20. The method of claim 15, further comprising:
select a computing node to store the data item; and
generating the first token and second token to comprise information indicative of the selected computing node.

* * * * *